US009297882B1

(12) United States Patent
Bhatia

(10) Patent No.: US 9,297,882 B1
(45) Date of Patent: *Mar. 29, 2016

(54) SYSTEMS AND METHODS FOR TRACKING PAIRED COMPUTING DEVICES

(75) Inventor: Yadvinder Bhatia, Punjab (IN)

(73) Assignee: Symantec Corporation, Mountain View, CA (US)

(*) Notice: Subject to any disclaimer, the term of this patent is extended or adjusted under 35 U.S.C. 154(b) by 700 days.

This patent is subject to a terminal disclaimer.

(21) Appl. No.: 12/982,552

(22) Filed: Dec. 30, 2010

(51) Int. Cl.
G08B 21/00 (2006.01)
G01S 5/02 (2010.01)
H04W 4/02 (2009.01)
G01S 19/51 (2010.01)

(52) U.S. Cl.
CPC ............ *G01S 5/0284* (2013.01); *G01S 5/0289* (2013.01); *G01S 19/51* (2013.01); *H04W 4/023* (2013.01)

(58) Field of Classification Search
CPC ...... H04W 4/023; G01S 19/51; G01S 5/0284; G01S 5/0289
USPC .................. 340/686.1, 686.6, 539.1, 539.11, 340/539.13, 539.14, 539.15; 455/404.2, 455/414.2, 456.1–457
See application file for complete search history.

(56) References Cited

U.S. PATENT DOCUMENTS

| 5,396,218 | A  | * | 3/1995  | Olah .......................... 340/568.7 |
| 5,708,417 | A  | * | 1/1998  | Tallman et al. ........... 340/539.23 |
| 7,064,669 | B2 | * | 6/2006  | Light .................... A01K 15/021 340/539.11 |
| 7,181,228 | B2 | * | 2/2007  | Boesch ...................... 455/456.1 |
| 7,437,167 | B2 | * | 10/2008 | Kartchner ................. 455/456.1 |
| 7,535,357 | B2 | * | 5/2009  | Enitan et al. ................. 340/571 |
| 7,855,652 | B1 | * | 12/2010 | Giovannelli et al. ...... 340/573.4 |
| 8,058,988 | B1 | * | 11/2011 | Medina et al. ........... 340/539.13 |
| 8,086,249 | B1 | * | 12/2011 | Dinan et al. .............. 455/456.1 |
| 8,116,748 | B2 | * | 2/2012  | Aaron ........................ 455/414.2 |
| 8,130,116 | B1 | * | 3/2012  | Daigle ....................... 340/686.6 |
| 8,810,392 | B1 | * | 8/2014  | Teller et al. ............. 340/539.32 |
| 2004/0121822 | A1 | * | 6/2004 | Kartchner ..................... 455/574 |
| 2004/0128159 | A1 | * | 7/2004 | McGinn et al. .................. 705/1 |

(Continued)

OTHER PUBLICATIONS

Nokia, Bluetooth Vibrating Bracelet—Mobile Phone Theft Prevention; http://www.blueunplugged.com/Bluetooth-Vibrating-Bracelet.aspx; Taken from site on Dec. 30, 2010.

(Continued)

*Primary Examiner* — Steven Lim
*Assistant Examiner* — Ryan Sherwin
(74) *Attorney, Agent, or Firm* — ALG INTELLECTUAL PROPERTY, LLC

(57) ABSTRACT

A computer-implemented method may include determining that a plurality of computing devices comprising first and second computing devices are paired via a wireless communication technology that facilitates communication between the computing devices. The computer-implemented method may also include establishing a maximum distance that the first and second computing devices are allowed to move away from one another. The computer-implemented method may further include calculating a current distance between the first and second computing devices and then determining that the current distance exceeds the maximum distance. In addition, the computer-implemented method may include providing a notification to at least one of the first and second computing devices to alert a user of the first computing device that the current distance between the first and second computing devices exceeds the maximum distance and to indicate a location of the second computing device. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2006/0145883 | A1* | 7/2006 | Fong et al. | 340/686.6 |
| 2007/0279237 | A1* | 12/2007 | Julian et al. | 340/686.1 |
| 2008/0174425 | A1* | 7/2008 | Torning | 340/540 |
| 2008/0214111 | A1* | 9/2008 | Moshir | H04M 1/66 455/41.2 |
| 2009/0182931 | A1* | 7/2009 | Gill et al. | 711/103 |
| 2010/0134275 | A1 | 6/2010 | Fitzgerald et al. | |
| 2010/0210290 | A1* | 8/2010 | Riley et al. | 455/466 |

OTHER PUBLICATIONS

Yadvinder Bhatia; Systems and Methods for Securing Data on Mobile Devices; U.S. Appl. No. 13/178,068, filed Jul. 7, 2011.

* cited by examiner

SYSTEMS AND METHODS FOR TRACKING PAIRED COMPUTING DEVICES

BACKGROUND

Computing devices have become a ubiquitous part of everyday life. In particular, millions of people may carry and use mobile computing devices (e.g., cellular telephones, MP3 players, laptops, Bluetooth headsets, etc.) throughout their daily activities. However, such computing devices (especially relatively small, mobile computing devices) may be easily misplaced by users and/or stolen by thieves.

Unfortunately, while traditional security mechanisms may enable a user to identify the location of a misplaced or stolen computing device after the fact, such traditional security mechanisms generally fail to alert the user at the point in time that the computing device is misplaced or stolen. As a result, the user may be unable to prevent the computing device from being misplaced or stolen in the first place. What is needed, therefore, is a mechanism for more effectively tracking computing devices and alerting users when computing devices are misplaced or stolen.

SUMMARY

As will be described in greater detail below, the instant disclosure generally relates to systems and methods for tracking paired computing devices. In one embodiment, a method for tracking paired computing devices may include determining that a plurality of computing devices are paired via a wireless communication technology (such as a Bluetooth technology, a Wi-Fi network, or a cellular network) that facilitates communication between the computing devices. For example, a determination module may determine that two cellular phones are paired via a Bluetooth technology. Examples of such paired computing devices include, without limitation, multiple cellular phones, a cellular phone and a Bluetooth headset, multiple cellular phones and a server, or any other suitable combination of paired computing devices.

A distance module may establish a maximum distance that the paired computing devices are allowed to move away from one another. In one example, the distance module may enable a user of one of the paired computing devices to specify the maximum distance via a user interface. In another example, the distance module may obtain a predetermined maximum distance from security software installed on the paired computing devices.

The distance module may also calculate a current distance between the paired computing devices. In one example, a paired computing device may send a communication to another paired computing device. In this example, the distance module may then determine the amount of time required to send the communication between the paired computing devices and then use this amount of time to calculate the current distance between the paired computing devices.

In another example, the distance module may obtain coordinates that identify a geographic location of each of the paired computing devices. For example, the distance module may obtain GPS coordinates that identify the geographic locations of two paired cellular phones from GPS devices located on the paired cellular phones. In this example, the distance module may use the coordinates to calculate the current distance between the paired computing devices.

The distance module may then determine that the current distance between the paired computing devices exceeds the maximum distance that the paired computing devices are allowed to move away from one another. For example, the distance module may compare the current distance with the maximum distance to determine that the current distance is greater than the maximum distance. After the current distance has been determined to exceed the maximum distance, a notification module may provide a notification to at least one of the paired computing devices to alert a user of the paired computing device that the current distance exceeds the maximum distance. The notification module may also notify the user of the location of at least one other paired computing device (e.g., the misplaced or stolen computing device). By alerting the user of the paired computing device that the current distance exceeds the maximum distance, and by providing the user with location information about a paired computing device, the notification may prompt the user to immediately find the paired computing device that is not in the user's possession to prevent such a paired computing device from being lost or stolen.

In some examples, the notification module may initiate a phone call and/or send a text message to at least one paired computing device (such as a paired cellular phone). In one example, the notification module may obtain coordinates that identify a geographic location of a paired cellular phone that has moved beyond the maximum distance. In this example, the notification module may then provide the geographic location of this paired cellular phone in a text message to enable another paired cellular phone to present the geographic location to a user in a geographic map. In other examples, the notification module may cause at least one paired computing device (such as a paired cellular phone or Bluetooth headset) to vibrate, emit at least one noise, and/or flash at least one light.

In further examples, the current distance between a paired server and a paired cellular phone may prevent the paired server from directly communicating with the paired cellular phone. In such examples, the notification module may send a notification from the paired server to another paired cellular phone to relay the notification to the paired cellular phone with which the server is unable to directly communicate.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
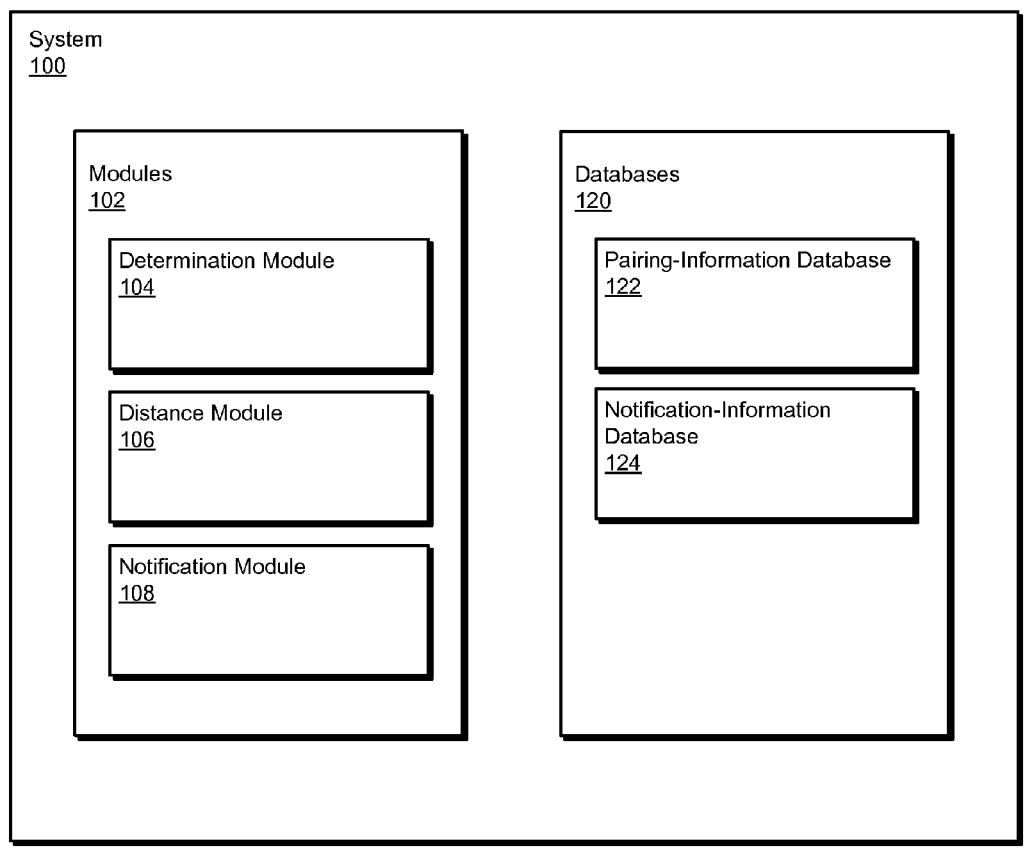
FIG. 1 is a block diagram of an exemplary system for tracking paired computing devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for tracking paired computing devices. For example, two cellular phones may pair via a Bluetooth technology to enable security software to monitor the distance between the paired cellular phones. If the distance between the paired cellular phones ever exceeds the maximum distance allowed by the security software (e.g., if a user inadvertently leaves a paired cellular phone at a particular location but walks away with another paired cellular phone), the security software may provide a notification to at least one of the paired cellular phones to alert a user that the distance between the paired cellular phones exceeds the maximum distance allowed by the security software and to provide device-location information to the user. By alerting the user that the distance between the paired cellular phones exceeds the maximum distance, and by providing device-location information to the user, the notification provided by the security software may prompt the user to immediately find the paired cellular phone that is not in the user's possession to prevent this paired cellular phone from being lost or stolen.

Figure 2:
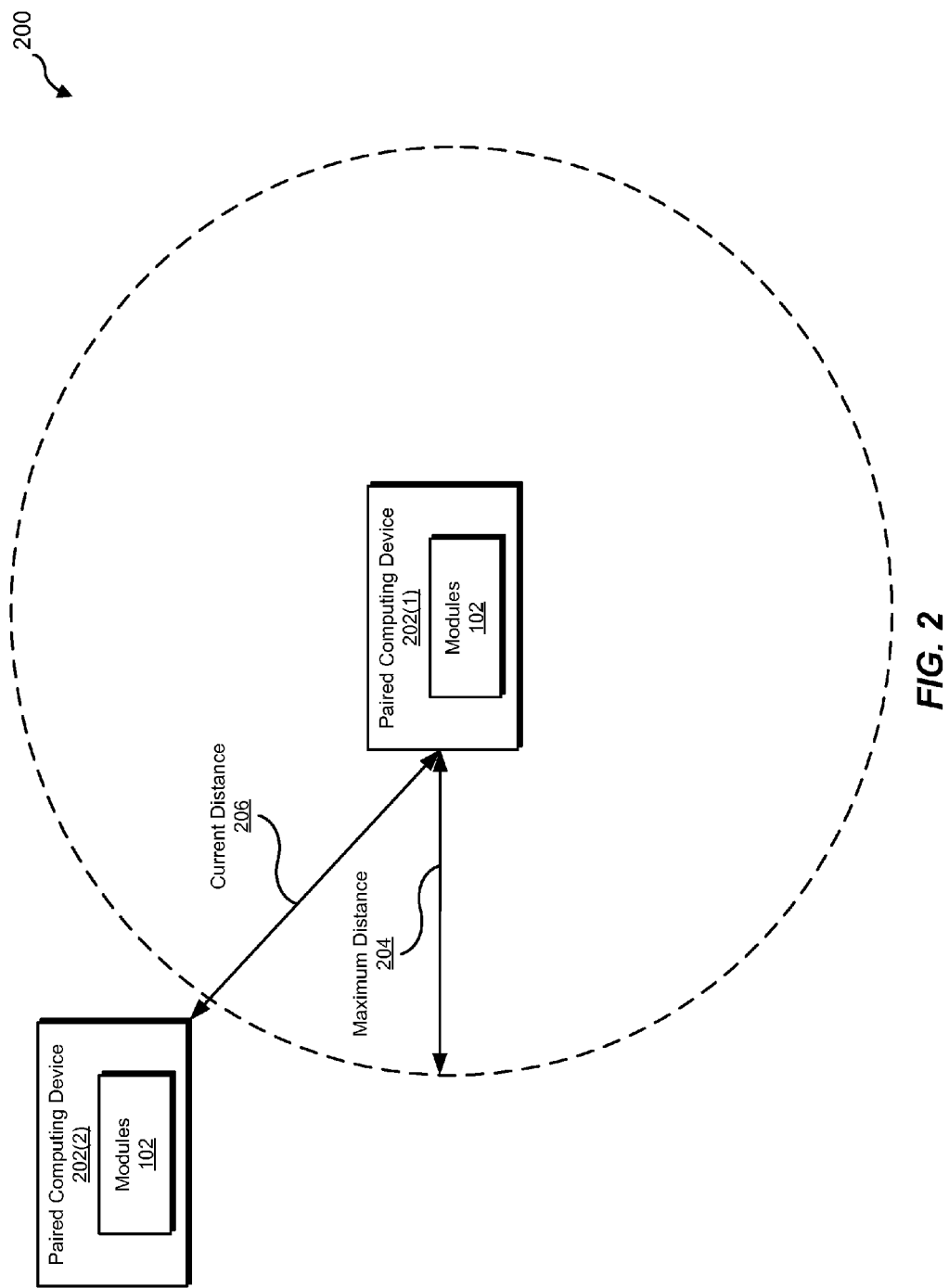
FIG. 2 is a block diagram of another exemplary system for tracking paired computing devices.

The following will provide, with reference to FIGS. 1-2, detailed descriptions of exemplary systems for tracking paired computing devices. Detailed descriptions of corresponding computer-implemented methods will also be provided in connection with FIG. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for tracking paired computing devices. As illustrated in this figure, exemplary system 100 may include one or more modules 102 for performing one or more tasks. For example, and as will be explained in greater detail below, exemplary system 100 may include a determination module 104 programmed to determine that a plurality of computing devices are paired via a wireless communication technology that facilitates communication between the computing devices.

Exemplary system 100 may also include a distance module 106 programmed to establish a maximum distance that the paired computing devices are allowed to move away from one another. Distance module 106 may be further programmed to calculate a current distance between the paired computing devices and then determine that the current distance between the paired computing devices exceeds the maximum distance. In addition, and as will be described in greater detail below, exemplary system 100 may include a notification module 108 programmed to provide a notification to at least one of the paired computing devices to alert a user of the paired computing device that the current distance between the paired computing devices exceeds the maximum distance and to provide the user with device-location information. Although illustrated as separate elements, one or more of modules 102 in FIG. 1 may represent portions of a single module or application (such as security software installed on paired computing devices or an application that provides one or more built-in functions of paired computing devices).

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as paired computing devices 202(1)-(2) in FIG. 2, server 502 in FIG. 5, cellular phones 508(1)-(2) in FIG. 5, computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a pairing-information database 122 configured to store information used to pair and/or identify a plurality of paired computing devices. Examples of such information include, without limitation, identification addresses (such as IP addresses or MAC addresses), registration keys, link keys, or any other information related to paired computing devices.

In addition, exemplary system 100 may include a notification-information database 124 configured to store information that identifies one or more types of notifications to be provided to paired computing devices. Examples of such information include, without limitation, location information for paired computing devices, information that directs notification module 108 to initiate a phone call to at least one paired computing device, send a text message to at least one paired computing device, cause at least one paired computing device to vibrate, cause at one paired computing device to vibrate or emit at least one noise or flash at least one light, or any other information related to notifications provided to paired computing devices.

Databases 120 in FIG. 1 may represent a portion of one or more computing devices. For example, databases 120 may represent a portion of one or more of paired computing devices 202(1)-(2) in FIG. 2, server 502 in FIG. 5, one or more of cellular phones 508(1)-(2) in FIG. 5, computing system 610 in FIG. 6, and/or portions of exemplary network architecture 700 in FIG. 7. Alternatively, databases 120 in FIG. 1 may represent one or more physically separate devices capable of being accessed by a computing device, such as one of paired computing devices 202(1)-(2) in FIG. 2, server 502 in FIG. 5, one of cellular phones 508(1)-(2) in FIG. 5, computing system 610 in FIG. 6, and/or portions of exemplary network architecture 700 in FIG. 7.

Exemplary system 100 in FIG. 1 may be deployed in a variety of ways. For example, all or a portion of exemplary system 100 may represent portions of exemplary system 200 in FIG. 2. As shown in FIG. 2, exemplary system 200 may include computing device 202(1)-(2) capable of pairing and communicating with one another via a wireless communication technology (such as a Bluetooth technology, a Wi-Fi network, or a cellular network). In one embodiment, and as will be described in greater detail below, paired computing devices 202(1)-(2) may be programmed by determination module 104 to pair via a wireless communication technology.

In some embodiments, paired computing devices 202(1)-(2) may be programmed by distance module 106 to establish a maximum distance that the paired computing devices are allowed to move away from one another. Paired computing devices 202(1)-(2) may also be programmed by distance module 106 to calculate a current distance between paired computing devices 202(1)-(2) and then determine that the current distance exceeds the maximum distance that paired computing devices 202(1)-(2) are allowed to move away from one another. In addition, paired computing devices 202(1)-(2) may be programmed by notification module 108 to provide a notification to at least one of paired computing devices 202(1)-(2) to alert a user of the paired computing device that the current distance between paired computing devices 202(1)-(2) exceeds the maximum distance.

Each of paired computing devices 202(1)-(2) generally represents any type or form of computing device capable of reading computer-executable instructions and pairing with another computing device via a wireless communication technology. Examples of paired computing devices 202(1)-(2) include, without limitation, cellular phones, Bluetooth headsets, laptop computers, tablet computers, MP3 players, Global Positioning System (GPS) devices, combinations of one or more of the same, and/or any other suitable computing devices.

In some embodiments, paired computing devices 202(1)-(2) may be paired via a wireless communication technology that facilitates communication between paired computing devices 202(1)-(2). Examples of such a wireless communication technology include, without limitation, a Bluetooth technology (such as a device that facilitates communication using the Bluetooth technology standard), a Wi-Fi network (such as a wireless local area network (WLAN) or a wireless personal area network (WPAN)), a cellular network (such as a GSM network or a CDMA network), or any other suitable wireless communication technology.

Figure 3:
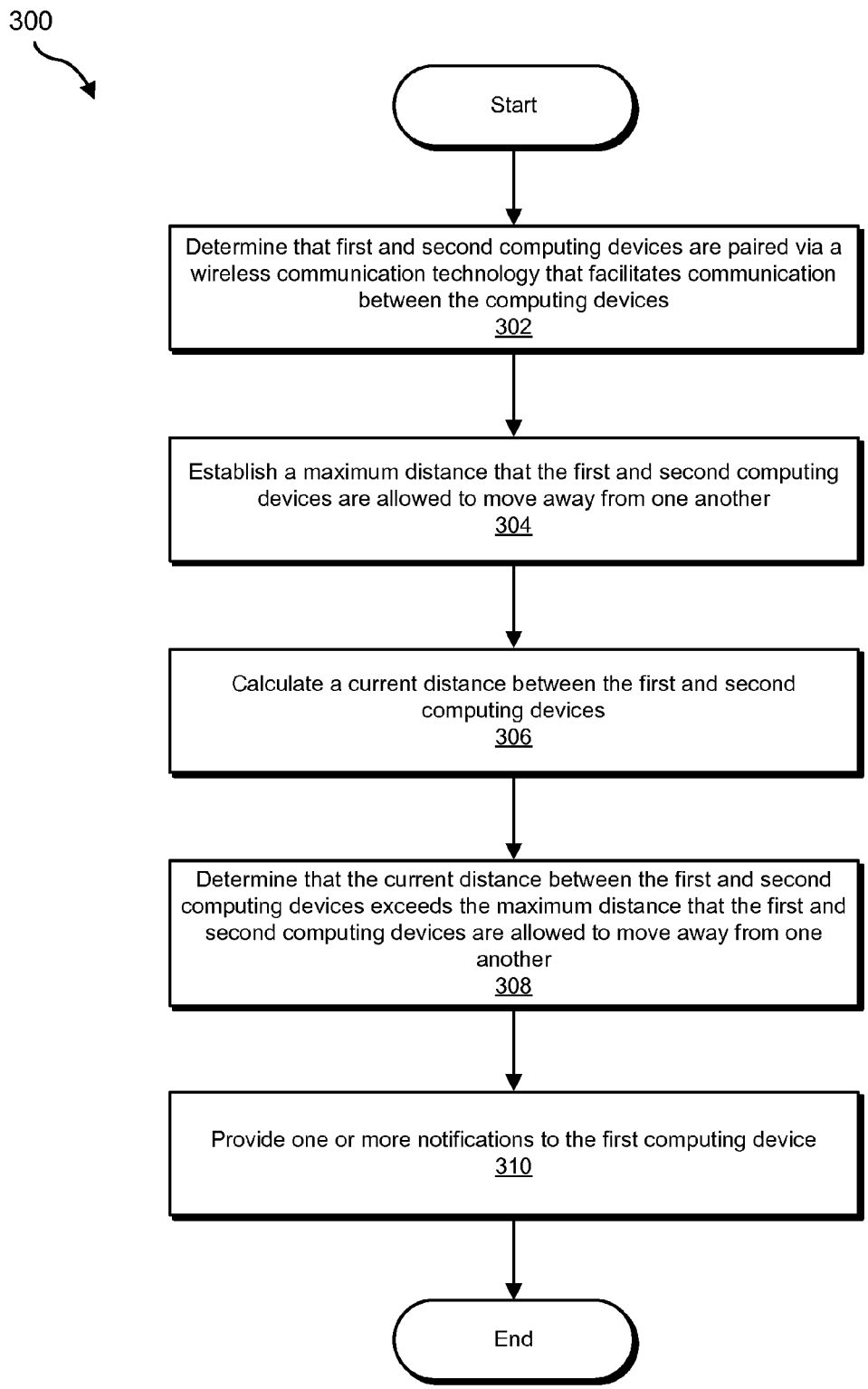
FIG. 3 is a flow diagram of an exemplary method for tracking paired computing devices.

FIG. 3 is a flow diagram of an exemplary computer-implemented method 300 for tracking paired computing devices. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated at step 302 in FIG. 3, the various systems described herein may determine that a plurality of computing devices are paired via a wireless communication technology that facilitates communication between the computing devices. For example, determination module 104 may, as part of one or more of computing devices 202(1)-(2), determine that computing devices 202(1)-(2) are paired via a wireless communication technology. In this example, the wireless communication technology may be a Bluetooth technology, a Wi-Fi network, a cellular network, or any other suitable wireless communication technology.

The term "paired" (or "pairing"), as used herein, generally refers to any type or form of secure connection that has been established between a plurality of computing devices. Such a secure connection may enable paired computing devices 202(1)-(2) to exchange encrypted communications and prevent other non-paired computing devices from interpreting encrypted communications exchanged between paired computing devices 202(1)-(2).

The systems described herein may perform step 302 in a variety of ways. In one example, determination module 104 may identify a link key that enables computing devices 202(1)-(2) to cryptographically authenticate communications received from one another. For example, determination module 104 may locate a link key within pairing-information database 122 stored on at least one of computing devices 202(1)-(2). In another example, determination module 104 may determine that a plurality of computing devices are paired via a wireless communication technology by identifying at least one encrypted communication sent between computing devices 202(1)-(2).

In some embodiments, the link key may be used to generate an encryption/decryption key that enables paired computing devices 202(1)-(2) to encrypt and/or decrypt communications from one another. In other embodiments, the link key itself may serve as an encryption/decryption key that enables paired computing devices 202(1)-(2) to encrypt and/or decrypt communications from one another.

In a further example, determination module 104 may determine that a plurality of computing devices are paired via a wireless communication technology by identifying at least one device identifier (such as an IP address, a MAC address, or a phone number) within pairing-information database 122. For example, determination module 104 may locate a device identifier that identifies paired computing device 202(1) within pairing-information database 122 stored on paired computing device 202(2). In this example, the device identifier may identify paired computing device 202(1) as a computing device that is paired with computing device 202(2) via a wireless network (such as a Wi-Fi network or cellular network).

In other embodiments, determination module 104 may determine that a plurality of computing devices are paired by querying one or more of the paired devices. For example, determination module 104 may query an operating system, Bluetooth service, wireless service, and/or any other suitable system on a device to determine whether the device is paired with another device.

As illustrated at step 304 in FIG. 3, the various systems described herein may establish a maximum distance that the paired computing devices are allowed to move away from one another. For example, distance module 106 may, as part of one or more of paired computing devices 202(1)-(2), establish a maximum distance 204 that paired computing devices 202(1)-(2) are allowed to move away from one another. In this example, maximum distance 204 may represent any distance within which the wireless communication technology is capable of facilitating communication between paired computing devices 202(1)-(2). In other examples, the maximum distance may be established as the maximum range of wireless communications between the paired devices.

The systems described herein may perform step 304 in a variety of ways. In one example, distance module 106 may establish maximum distance 204 by obtaining a predetermined maximum distance from security software installed on paired computing devices 202(1)-(2). For example, the predetermined maximum distance may be stored as a default setting within the security software installed on paired computing devices 202(1)-(2).

In another example, distance module 106 may enable a user of paired computing device 202(1) to specify maximum distance 204. For example, distance module 106 may cause paired computing device 202(1) to display a user interface that enables a user of paired computing device 202(1) to enter maximum distance 204. In this example, the user interface may prompt the user to enter maximum distance 204 or simply allow the user to change maximum distance 204 (from, e.g., a predetermined maximum distance) without being prompted.

As illustrated at step 306 in FIG. 3, the various systems described herein may calculate a current distance between the paired computing devices. For example, distance module 106 may, as part of one or more of paired computing devices 202(1)-(2), calculate a current distance 206 between paired computing devices 202(1)-(2). In this example, current distance 206 may represent a distance measured between paired computing devices 202(1)-(2) at a particular point in time. In addition, distance module 106 may be configured to calculate a new current distance at scheduled intervals.

The systems described herein may perform step 306 in a variety of ways. In one example, paired computing device 202(1) may send a communication to paired computing device 202(2) and determine the amount of time required to send the communication from paired computing device 202(1) to paired computing device 202(2). In this example, distance module 106 may then use the amount of time required to send the communication from paired computing device 202(1) to paired computing device 202(2) to calculate current distance 206 between paired computing devices 202(1)-(2). For example, distance module 106 may calculate current distance 206 by multiplying the amount of time required to send the communication by the known speed (e.g., the speed of light divided by the refractive index of air) at which the communication travelled from paired computing device 202(1) to paired computing device 202(2).

In another example, distance module 106 may obtain coordinates that identify a geographic location of each of paired computing devices 202(1)-(2). For example, distance module 106 may obtain a set of GPS coordinates that identify the geographic location of paired computing device 202(1) from a GPS device located on paired computing device 202(1). Similarly, distance module 106 may obtain another set of GPS coordinates that identify the geographic location of paired computing device 202(2) from another GPS device located on paired computing device 202(2). In this example, distance module 106 may cause computing device 202(1) to send the set of GPS coordinates that identify the geographic location of paired computing device 202(1) to paired computing device 202(2).

After computing device 202(2) has received the set of GPS coordinates that identify the geographic location of paired computing device 202(1), distance module 106 may use both sets of GPS coordinates to calculate current distance 206 between paired computing devices 202(1)-(2). For example, distance module 106 may identify the respective latitude and longitude coordinates of paired computing devices 202(1)-(2) within the sets of GPS coordinates. In this example, distance module 106 may then calculate the current distance between paired computing devices 202(1)-(2) by applying the latitude and longitude coordinates (formatted in radians) to a Haversine formula based on the Earth's radius.

In some embodiments, distance module 106 may calculate a current distance between the first and second computing devices by determining that the first and second computing devices are not within range of one another. For example, distance module 106 may determine that the first and second computing devices are no longer within a wireless range of each other (e.g., by determining that the devices are no longer paired and/or that the devices are unable to pair). In such embodiments, the maximum distance is established by the range of the wireless mechanism used to pair the devices.

As illustrated at step 308 in FIG. 3, distance module 106 may determine that the current distance between the paired computing devices exceeds the maximum distance that the paired computing devices are allowed to move away from one another. For example, distance module 106 may, as part of one or more of paired computing devices 202(1)-(2), determine that current distance 206 exceeds maximum distance 204.

The systems described herein may perform step 308 in a variety of ways. In one example, distance module 106 may determine that current distance 206 exceeds maximum distance 204 by comparing current distance 206 with maximum distance 204. For example, distance module 106 may compare current distance 206 with maximum distance 204 and determine that current distance 206 is greater than maximum distance 204.

In embodiments where calculating the current distance between paired computing devices comprises determining that the paired computing devices are no longer within wireless range of each other, determining that the current distance between the first and second computing devices exceeds the maximum range may include checking a policy (e.g., a policy set by establishing the maximum distance in step 304) to determine whether the devices are allowed out of wireless range of one another. If the policy indicates that the devices are not allowed to be out of wireless range of one another, distance module 106 may conclude that the maximum distance has been exceeded. In such embodiments, the paired devices may not be able to communication with each other, and any notifications sent between the paired devices may be transmitted through an intermediate network (e.g., the Internet, a WAN, a LAN, etc.) and/or through an intermediate paired device that is still within range of each of the other paired devices.

As illustrated at step 310 in FIG. 3, distance module 106 may provide a notification to at least one of the paired computing devices to alert a user of the paired computing device that the current distance between the paired computing devices exceeds the maximum distance. For example, notification module 108 may, as part of one or more of paired computing devices 202(1)-(2), provide a notification to at least one of paired computing devices 202(1)-(2) to alert a user of the paired computing device that current distance 206 exceeds maximum distance 204. In this example, notification module 108 may determine the type of notification (e.g., phone call, text message, vibration, flashing light, and/or noise) to provide to the paired computing device by locating information that identifies the type of notification within notification-information database 124.

The systems described herein may perform step 310 in a variety of ways. In one example, notification module 108 may initiate a phone call to paired computing device 202(1) and/or paired computing device 202(2). For example, if paired computing devices 202(1)-(2) represent two paired cellular phones, notification module 108 may initiate a phone call from one paired cellular phone to another paired cellular phone. In this example, the phone call may alert a user of the other paired cellular phone that current distance 206 exceeds maximum distance 204. For example, the phone call may play a prerecorded sound clip that verbally informs the user that current distance 206 exceeds maximum distance 204.

In another example, notification module 108 may cause at least one of paired computing devices 202(1)-(2) to vibrate. For example, if paired computing devices 202(1)-(2) represent two paired cellular phones, notification module 108 may cause at least one of the paired cellular phones to vibrate. Similarly, if paired computing devices 202(1)-(2) represent a cellular phone and a Bluetooth headset, notification module 108 may cause at least one of the cellular phone and the Bluetooth headset to vibrate. In this example, by causing at least one of paired computing devices 202(1)-(2) to vibrate, notification module 108 may alert a user of the paired computing device that current distance 206 exceeds maximum distance 204.

In a further example, notification module 108 may cause at least one of paired computing devices 202(1)-(2) to emit a noise. For example, if paired computing devices 202(1)-(2) represent two paired cellular phones, notification module 108 may cause at least one of the paired cellular phones to emit a noise (such as a chime) that indicates current distance 206 exceeds maximum distance 204. Similarly, if paired computing devices 202(1)-(2) represent a cellular phone and a Bluetooth headset (respectively), notification module 108 may cause at least one of the cellular phone and the Bluetooth headset to emit a noise (such as a chime) that indicates current distance 206 exceeds maximum distance 204. In this example, by causing at least one of paired computing devices 202(1)-(2) to emit a noise, notification module 108 may alert a user of the paired computing device that current distance 206 exceeds maximum distance 204.

In an additional example, notification module 108 may cause at least one of paired computing devices 202(1)-(2) to flash at least one light. For example, if paired computing devices 202(1)-(2) represent two paired cellular phones, notification module 108 may cause at least one of the paired cellular phones to flash at least one light that indicates current distance 206 exceeds maximum distance 204. Similarly, if paired computing devices 202(1)-(2) represent a cellular phone and a Bluetooth headset (respectively), notification module 108 may cause at least one of the cellular phone and the Bluetooth headset to flash at least one light that indicates current distance 206 exceeds maximum distance 204. In this example, by causing at least one of paired computing devices 202(1)-(2) to flash at least one light, notification module 108 may alert a user of the paired computing device that current distance 206 exceeds maximum distance 204.

In some examples, notification module 108 may send a text message, voice message, email, instant message, or other electronic message to paired computing device 202(1) and/or paired computing device 202(2). For example, if paired computing devices 202(1)-(2) represent two paired cellular phones, notification module 108 may send a text message from one paired cellular phone to another paired cellular phone. In this example, the text message may alert a user of the other paired cellular phone that current distance 206 exceeds maximum distance 204.

In one example, notification module 108 may provide location information that indicates the location of one or more of the paired devices. For example, notification module 108 may provide coordinates that identify the geographic location of the paired cellular phone in the text message sent to the other paired cellular phone. In one embodiment, notification module 108 may obtain GPS coordinates that identify the geographic location of the paired cellular phone from a GPS device. In this example, notification module 108 may then include the GPS coordinates that identify the geographic location of the cellular phone in a text message, email message, instant message, voice message, and/or other message sent to the other paired cellular phone. This message may enable the other paired cellular phone to present the geographic location of the misplaced or stolen paired cellular phone to a user in a geographic map.

Notification module 108 may also provide location information in a variety of other ways. For example, notification module 108 may use cellular-phone triangulation data to identify a location of a paired device (e.g., a lost or stolen device) and may send this location information to another paired device (e.g., a device that is still with a user).

In some embodiments, notification module 108 may send a notification that causes a misplaced or stolen device to be locked or otherwise disabled to protect confidential information. For example, notification module 108 may send a notification to a cellular telephone or laptop that causes the phone or laptop to lock itself against unauthorized access.

Figure 4:
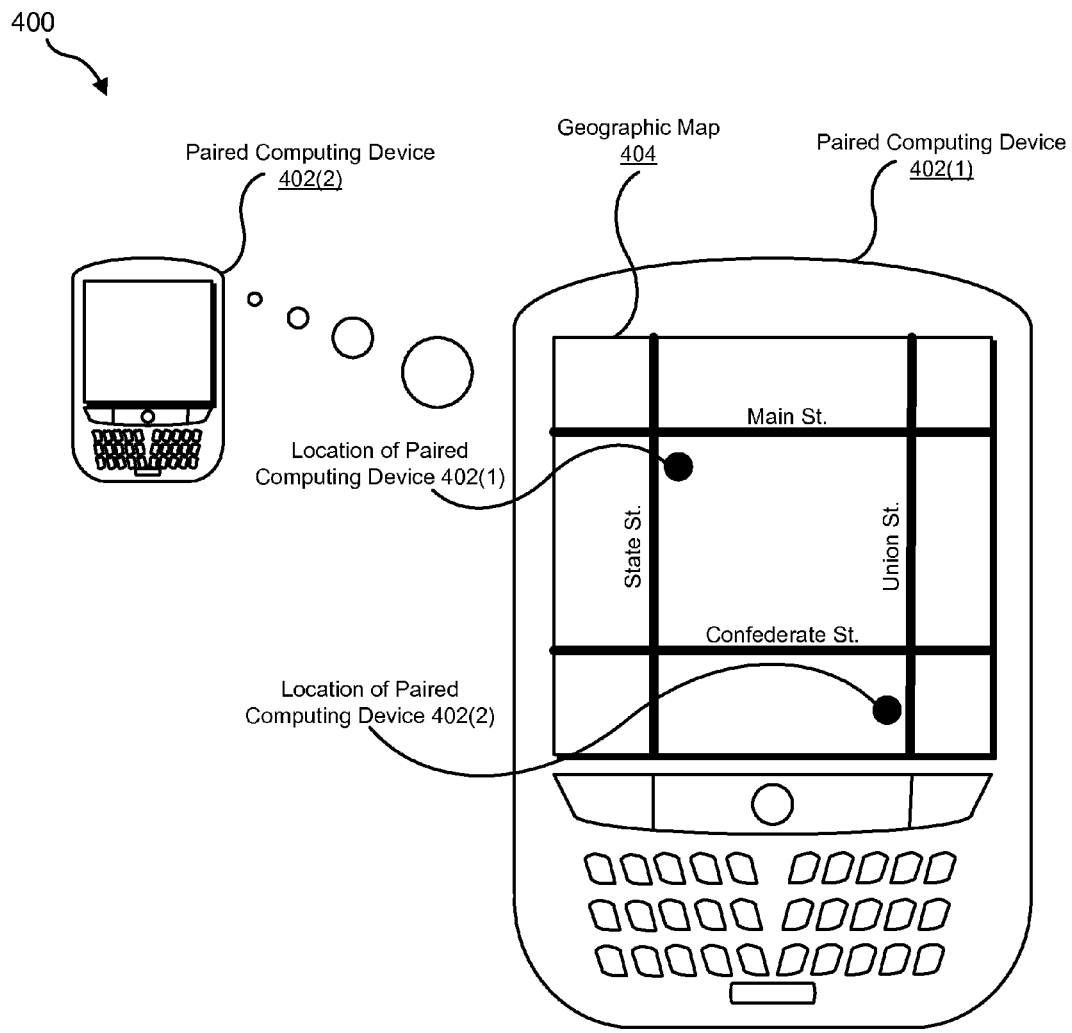
FIG. 4 is a diagram of an exemplary text message sent to a paired computing device.

As illustrated in FIG. 4, exemplary text message 400 may be sent from paired cellular phone 402(2) to paired cellular phone 402(1). In one example, exemplary text message 400 may include coordinates that identify the geographic location of paired cellular phone 402(2). In this example, upon identifying the coordinates within exemplary text message 400, paired cellular phone 402(1) may use the coordinates to present the geographic location of paired cellular phone 402(2) relative to the geographic location of paired cellular phone 402(1) in a geographic map 404.

In some embodiments, geographic map 404 may include one or more physical structures and/or landmarks to provide identifying context to the geographic location of paired cellular phone 402(1) and/or paired cellular phone 402(2). For example, geographic map 404 may include one or more streets (e.g., "State St.," "Main St.," "Union St.," and "Confederate St.") that surround the geographic location of paired cellular phone 402(1) and/or paired cellular phone 402(2). In addition, geographic map 404 may be presented to a user in a variety of designs, styles, shapes, colors, and/or sizes.

In some embodiments, notification module 108 may send one or more notifications to each of the paired computing devices. In other embodiments, notification module 108 may send one or more notification to only one of the paired devices or to any other subset of the paired devices. In such embodiments, notification module 108 and/or distance module 106 may attempt to determine which of the paired devices is lost or misplaced so that a notification may be send to one or more other paired devices that are still in the user's possession. For example, distance module 108 may determine (e.g., using GPS, an accelerometer, or any other suitable technology) that one of the paired devices is moving and the other paired device is not moving. In such embodiments, distance module 104 may assume that the moving device is the device that is still with the user and may send the notification only to the moving paired device.

In other embodiments, distance module 104 may assume that a stationary device is with the user (e.g., if the moving device is stolen) and may send the notification to only the stationary paired device. A user may be able to select which mode (i.e., send notifications only to stationary devices, send notifications only to the moving device, send notifications to all devices, send notifications to a subset of devices, etc.) notification module 108 uses for providing notifications.

Figure 5:
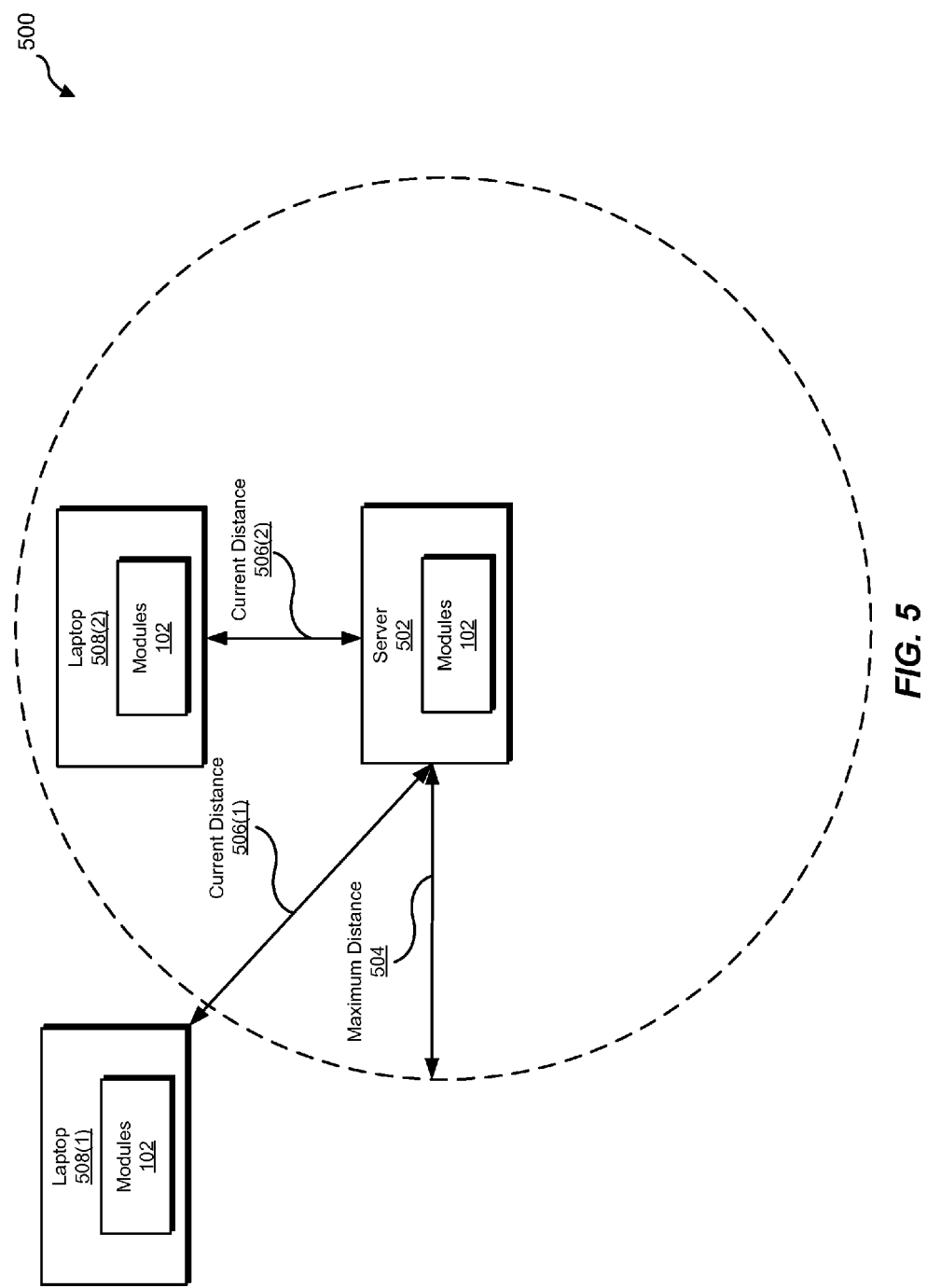
FIG. 5 is a block diagram of an exemplary system for tracking paired computing devices.

As illustrated in FIG. 5, exemplary system 500 may include server 502 and laptops 508(1)-(2) capable of pairing and communicating with one another via a wireless communication technology (such as a Bluetooth technology, a Wi-Fi network, or a cellular network). For example, each of laptops 508(1)-(2) may be paired with server 502 via a Wi-Fi network. In another example, server 502 and laptops 508(1)-(2) may all be paired with one another via a Wi-Fi network. FIG. 5 may represent an enterprise environment where a company does not want devices to leave its premises (e.g., for data-loss-prevention purposes).

Similar to maximum distance 204 in FIG. 2, maximum distance 504 in FIG. 5 may represent a maximum distance that laptops 508(1)-(2) are allowed to move away from server

502. Maximum distance 504 may be established in a variety of ways, including any of those described above in connection with maximum distance 204.

Similar to current distance 206 in FIG. 2, each of current distances 506(1)-(2) in FIG. 5 may represent a current distance between one of laptops 508(1)-(2) and server 502. Current distances 506(1)-(2) may be calculated in a variety of ways, including any of those described above in connection with current distance 206.

In one example, distance module 106 may determine that current distance 506(1) is preventing server 502 from being able to directly communicate with laptop 508(1). For example, server 502 may be unable to directly communicate with laptop 508(1) because laptop 508(1) is out of range (meaning that the wireless communication technology is unable to facilitate communication at current distance 506(1)). In this example, notification module 108 may send the notification from server 502 to laptop 508(2). Upon receiving the notification, laptop 508(2) may then relay the notification to laptop 508(1) with which server 502 is unable to directly communicate. In some embodiments, such a notification may notify a user of laptop 508(1) that the laptop is out of an approved area and should be returned to the approved area. In certain embodiments, the notification may disable laptop 508(1) (e.g., by shutting down laptop 508(1), locking laptop 508(1), etc.) to unauthorized access of data on laptop 508(1).

Figure 6:
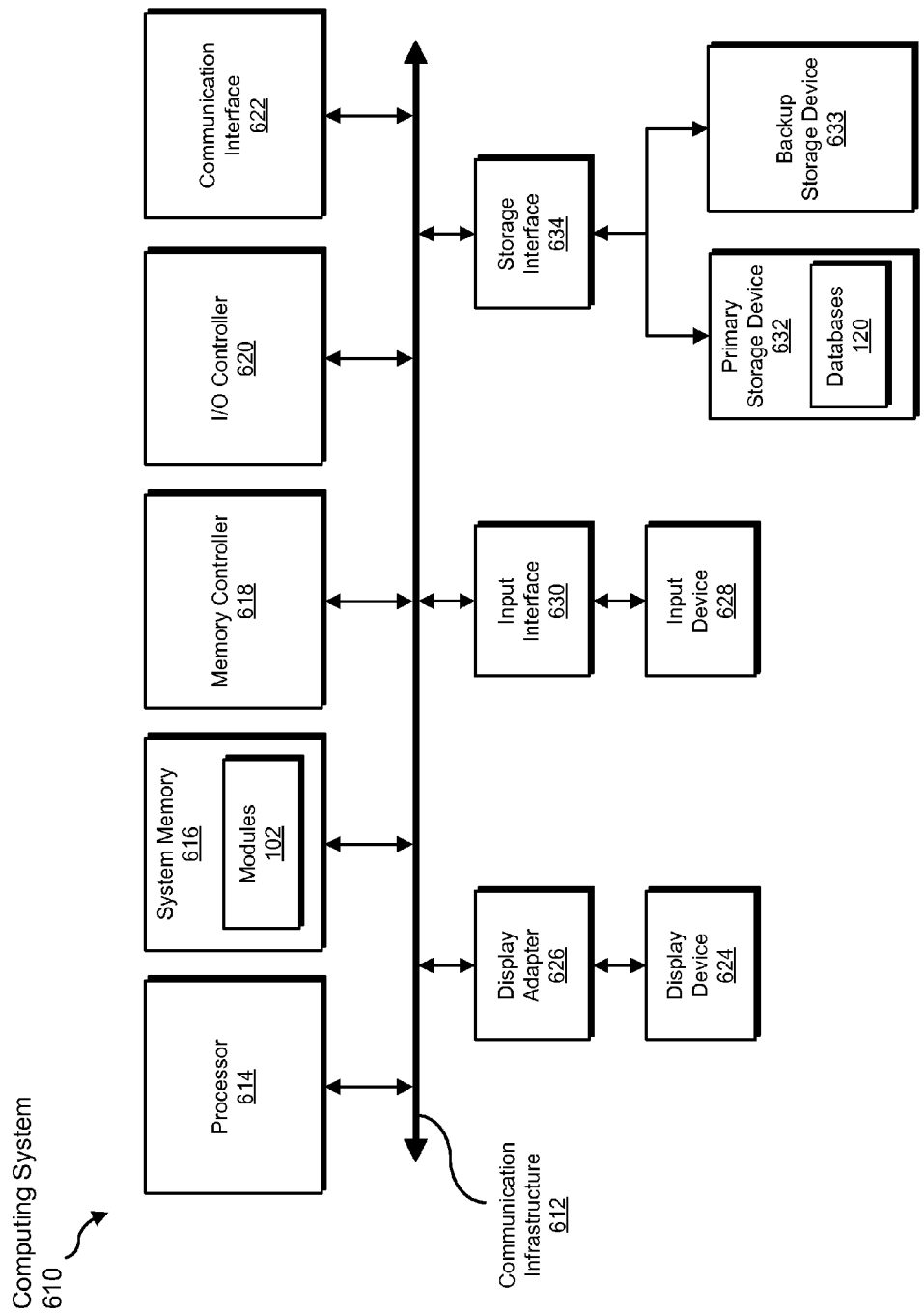
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the pairing, establishing, calculating, determining, providing, enabling, obtaining, sending, using, initiating, and causing steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as pairing, establishing, calculating, determining, providing, enabling, obtaining, sending, using, initiating, and causing.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the pairing, establishing, calculating, determining, providing, enabling, obtaining, sending, using, initiating, and causing steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the pairing, establishing, calculating, determining, providing, enabling, obtaining, sending, using, initiating, and causing steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the pairing, establishing, calculating, determining, providing, enabling, obtaining, sending, using, initiating, and causing steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, databases 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the pairing, establishing, calculating, determining, providing, enabling, obtaining, sending, using, initiating, and causing steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
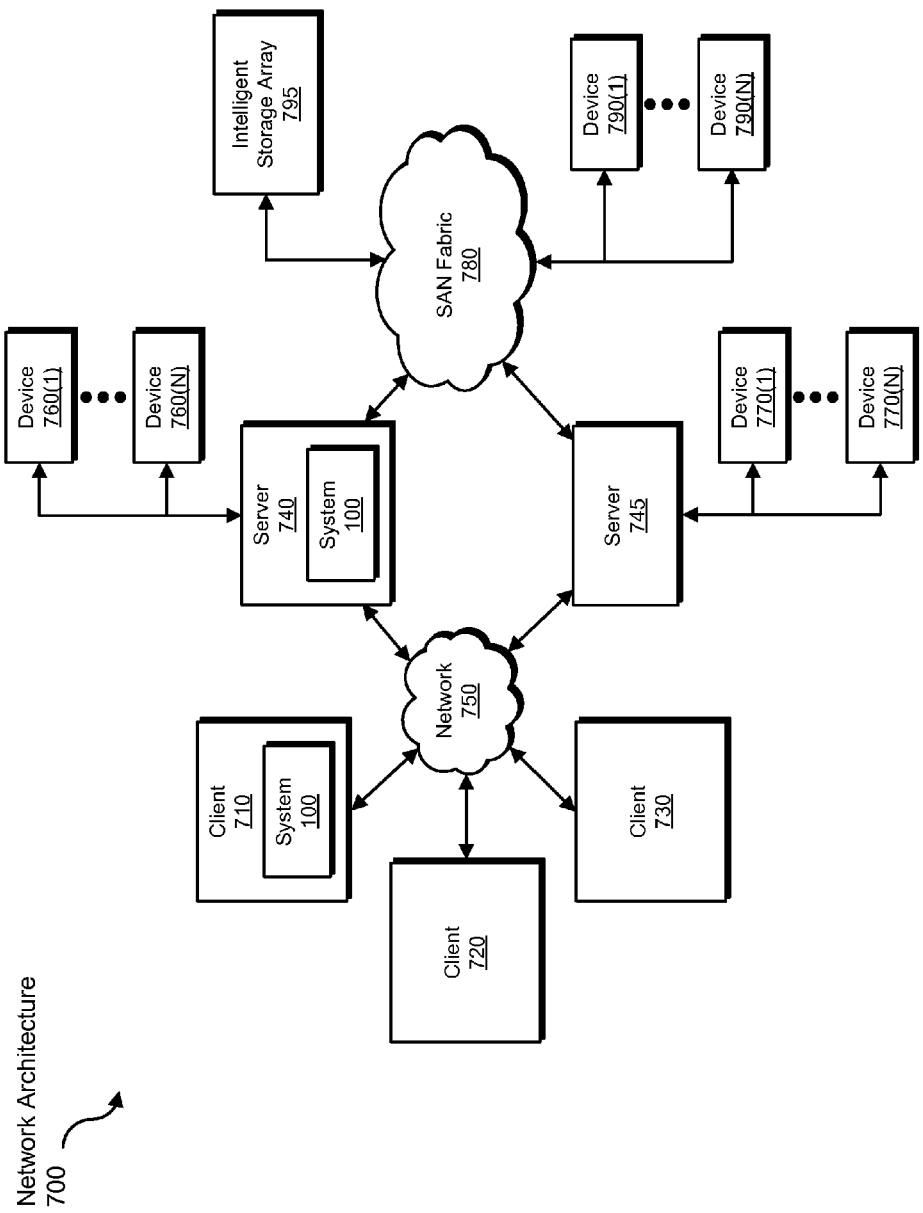
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the pairing, establishing, calculating, determining, providing, enabling, obtaining, sending, using, initiating, and causing steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for tracking paired computing devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of modules 102 in FIG. 1 may transform a characteristic or property of a physical device (such as a cellular phone or Bluetooth headset) by providing a notification that indicates that the distance between the physical device and another physical device exceeds a maximum distance.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for tracking paired computing devices, at least a portion of the method being performed by at least one computing system comprising at least one processor, the method comprising:
   determining that a plurality of computing devices comprising first and second computing devices of a user are paired via a wireless communication technology that facilitates communication between the plurality of computing devices;
   providing a plurality of modes for notifying the user when the first computing device or the second computing device is no longer in the user's possession, wherein the plurality of modes comprise:
      a first mode that causes notifications to be sent only to a device that is stationary;
      a second mode that causes notifications to be sent only to a device that is moving; and
      a third mode that causes notifications to be sent to both the first and second computing devices;
   establishing a maximum distance that the first and second computing devices are allowed to move away from one another;
   calculating a current distance between the first and second computing devices;
   determining that the current distance between the first and second computing devices exceeds the maximum distance that the first and second computing devices are allowed to move away from one another;
   determining, due at least in part to the current distance between the first and second computing devices exceeding the maximum distance, that at least one of the first and second computing devices is no longer in the user's possession; and
   in response to determining that at least one of the first and second computing devices is no longer in the user's possession:
      determining that the second computing device is no longer in the user's possession by determining that the first computing device is moving and the second computing device is substantially stationary; and
      providing, based at least in part on a selection by the user of the second mode that causes notifications to be sent only to a device that is moving, one or more notifications only to the first computing device and not to the second computing device due at least in part to the first computing device moving and the second computing device being substantially stationary, wherein the one or more notifications:
         alert the user that the second computing device is no longer in the user's possession due at least in part to the first computing device moving and the second computing device being substantially stationary, and
         include information that identifies a location of the second computing device.

2. The computer-implemented method of claim 1, wherein determining that the plurality of computing devices are paired via the wireless communication technology comprises at least one of:
   determining that the plurality of computing devices are paired via a Wi-Fi network; and
   determining that the plurality of computing devices are paired via a cellular network.

3. The computer-implemented method of claim 1, wherein establishing the maximum distance that the first and second computing devices are allowed to move away from one another comprises receiving the maximum distance from the user.

4. The computer-implemented method of claim 1, wherein calculating the current distance between the first and second computing devices comprises:
   sending a communication between the first and second computing devices;
   determining an amount of time required to send the communication between the first and second computing devices; and
   using the amount of time required to send the communication between the first and second computing devices to calculate the current distance between the first and second computing devices.

5. The computer-implemented method of claim 1, wherein calculating the current distance between the first and second computing devices comprises:
   obtaining coordinates that identify a geographic location of the first and second computing devices; and
   using the coordinates to calculate the current distance between the first and second computing devices.

6. The computer-implemented method of claim 5, wherein obtaining the coordinates that identify the geographic location comprises obtaining the coordinates from a Global Positioning System device.

7. The computer-implemented method of claim 1, wherein the plurality of computing devices comprise at least one of:
   a plurality of cellular phones;
   a cellular phone and a Bluetooth headset; or
   a cellular phone and a server.

8. The computer-implemented method of claim 7, wherein providing the one or more notifications only to the first computing device comprises at least one of:
   initiating a phone call to the first computing device;
   sending a text message to the first computing device; and
   causing the first computing device to emit at least one noise.

9. The computer-implemented method of claim 8, wherein providing the one or more notifications only to the first computing device comprises:
   obtaining coordinates that identify a geographic location of the second computing device; and
   providing the coordinates that identify the geographic location of the second computing device in a message to the first computing device to enable the first computing device to present the geographic location to the user in a geographic map.

10. The computer-implemented method of claim 7, wherein providing the one or more notifications only to the first computing device comprises at least one of:
    causing the Bluetooth headset to emit at least one noise; and
    causing the Bluetooth headset to flash at least one light.

11. The computer-implemented method of claim 1, wherein:
    the second computing device comprises a cellular phone;
    providing the one or more notifications from the first computing device to the cellular phone comprises:
       determining that the current distance is preventing the first computing device from being able to directly communicate with the cellular phone via the wireless communication technology; and
       sending the notification from the first computing device to another cellular phone to relay the notification to the cellular phone with which the first computing device is unable to directly communicate.

12. The method of claim 1, wherein providing the one or more notifications only to the first computing device comprises prompting the user to immediately find the second computing device based at least in part on the identified location of the second computing device to prevent the second computing device from being lost or stolen.

13. The method of claim 1, further comprising locking the second computing device to protect against unauthorized access of confidential information.

14. The method of claim 1, further comprising presenting, to the user of the first computing device, a geographic map that identifies the location of the second computing device relative to a location of the first computing device.

15. A system for tracking paired computing devices, the system comprising:
  at least one processor;
  a determination module programmed to direct the at least one processor to determine that a plurality of computing devices comprising first and second computing devices of a user are paired via a wireless communication technology that facilitates communication between the plurality of computing devices;
  a distance module programmed to direct the at least one processor to:
    establish a maximum distance that the first and second computing devices are allowed to move away from one another;
    calculate a current distance between the first and second computing devices;
    determine that the current distance between the first and second computing devices exceeds the maximum distance that the first and second computing devices are allowed to move away from one another;
    determine, due at least in part to the current distance between the first and second computing devices exceeding the maximum distance, that at least one of the first and second computing devices is no longer in the user's possession;
    determine that the second computing device is no longer in the user's possession by determining that the first computing device is moving and the second computing device is substantially stationary; and
  a notification module programmed to direct the at least one processor to:
    provide a plurality of modes for notifying the user when the first computing device or the second computing device is no longer in the user's possession, wherein the plurality of modes comprise:
      a first mode that causes notifications to be sent only to a device that is stationary;
      a second mode that causes notifications to be sent only to a device that is moving; and
      a third mode that causes notifications to be sent to both the first and second computing devices; and
    provide, based at least in part on a selection by the user of the second mode that causes notifications to be sent only to a device that is moving the second computing device to the first computing device, one or more notifications only to the first computing device and not to the second computing device due at least in part to the first computing device moving and the second computing device being substantially stationary, wherein the one or more notifications:
      alert the user that the second computing device is no longer in the user's possession due at least in part to the first computing device moving and the second computing device being substantially stationary the current distance between the first and second computing devices exceeding the maximum distance; and
      include information that identifies a location of the second computing device.

16. The system of claim 15, wherein the wireless communication technology comprises at least one of:
  a Wi-Fi network; and
  a cellular network.

17. The system of claim 15, wherein the distance module is programmed to direct the at least one processor to receive the maximum distance from the user.

18. The system of claim 15, wherein the distance module is programmed to direct the at least one processor to:
  send a communication between the first and second computing devices;
  determine an amount of time required to send the communication between the first and second computing devices; and
  use the amount of time required to send the communication between the first and second computing devices to calculate the current distance between the first and second computing devices.

19. The system of claim 15, wherein the distance module is programmed to direct the at least one processor to:
  obtain coordinates that identify a geographic location of the first and second computing devices; and
  use the coordinates to calculate the current distance between the first and second computing devices.

20. A non-transitory computer-readable-storage medium comprising one or more computer-executable instructions that, when executed by at least one processor of a computing system, cause the computing system to:
  determine that a plurality of computing devices comprising first and second computing devices of a user are paired via a wireless communication technology that facilitates communication between the plurality of computing devices;
  provide a plurality of modes for notifying the user when the first computing device or the second computing device is no longer in the user's possession, wherein the plurality of modes comprise:
    a first mode that causes notifications to be sent only to a device that is stationary;
    a second mode that causes notifications to be sent only to a device that is moving; and
    a third mode that causes notifications to be sent to both the first and second computing devices;
  establish a maximum distance that the first and second computing devices are allowed to move away from one another;
  calculate a current distance between the first and second computing devices;
  determine that the current distance between the first and second computing devices exceeds the maximum distance that the first and second computing devices are allowed to move away from one another;
  determine, due at least in part to the current distance between the first and second computing devices exceeding the maximum distance, that at least one of the first and second computing devices is no longer in the user's possession; and
  in response to determining that at least one of the first and second computing devices is no longer in the user's possession:
    determine that the second computing device is no longer in the user's possession by determining that the first computing device is moving and the second computing device is substantially stationary; and provide, based at least in part on a selection by the user of the second mode that causes notifications to be sent only to a device that is moving the second computing device to the first computing device, one or more notifications only to the first computing device and not to the second computing device due at least in part to the first computing device moving and the second computing device being substantially stationary, wherein the one or more notifications:

alert the user that the second computing device is no longer in the user's possession due at least in part to the first computing device moving and the second computing device being substantially stationary the current distance between the first and second computing devices exceeding the maximum distance, and include information that identifies a location of the second computing device.

* * * * *